US010528750B2

(12) United States Patent
Schneider et al.

(10) Patent No.: US 10,528,750 B2
(45) Date of Patent: Jan. 7, 2020

(54) EXECUTION OF BULK REQUESTS AGAINST ONE OR MORE DATABASES

(71) Applicant: salesforce.com, inc., San Francisco, CA (US)

(72) Inventors: Donovan A. Schneider, San Francisco, CA (US); Guillaume Le Stum, San Francisco, CA (US); Leo Tenenblat, Albany, CA (US); Wei Li, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 283 days.

(21) Appl. No.: 15/479,985

(22) Filed: Apr. 5, 2017

(65) Prior Publication Data

US 2017/0249475 A1    Aug. 31, 2017

Related U.S. Application Data

(63) Continuation of application No. 13/874,379, filed on Apr. 30, 2013, now Pat. No. 9,619,530, which is a (Continued)

(51) Int. Cl.
*G06F 3/00* (2006.01)
*G06F 21/62* (2013.01)
(Continued)

(52) U.S. Cl.
CPC ...... *G06F 21/6218* (2013.01); *G06F 16/2386* (2019.01); *G06F 16/248* (2019.01); *G06F 16/24558* (2019.01); *G06Q 10/06* (2013.01)

(58) Field of Classification Search
CPC .. G06F 17/00; G06F 19/3462; G06F 16/2453; G06F 16/338; G06F 16/907; G06F 16/951; G06F 16/9535; G06F 17/28; G06F 13/10; G06F 15/177; G06F 15/7871; G06F 16/128; G06F 16/14; G06F 16/162; G06F 16/245; G06F 16/2455; G06F 16/24578; G06F 16/313; G06F 16/334; G06F 16/35; G06F 16/353; G06F 16/355; G06F 16/36; G06F 16/38; G06F 16/41; G06F 16/5838; G06F 16/7867; G06F 16/93; G06F 16/94; G06F 16/9562; G06F 17/212; G06F 17/2211; G06F 17/2235; G06F 17/241; G06F 17/242; G06F 17/274;
(Continued)

(56) References Cited

U.S. PATENT DOCUMENTS 5,577,188 A    11/1996    Zhu
5,608,872 A     3/1997    Schwartz et al.
(Continued)

OTHER PUBLICATIONS

Nancy Conner, "Google Apps: The Missing Manual," O'Reilly Media, Inc., May 27, 2008, 38 pages.

*Primary Examiner* — Di Xiao
(74) *Attorney, Agent, or Firm* — Kowert, Hood, Munyon, Rankin & Goetzel, P.C.

(57) ABSTRACT

In accordance with embodiments, there are provided mechanisms and methods for displaying one or more data sets to a user. These mechanisms and methods for displaying one or more data sets to a user can enable enhanced data security, more relevant data display, reduced processing, etc.

18 Claims, 6 Drawing Sheets

Related U.S. Application Data continuation of application No. 13/006,366, filed on Jan. 13, 2011, now Pat. No. 9,471,648.

(60) Provisional application No. 61/309,314, filed on Mar. 1, 2010.

(51) Int. Cl.
*G06F 16/248* (2019.01)
*G06F 16/23* (2019.01)
*G06F 16/2455* (2019.01)
*G06Q 10/06* (2012.01)

(58) Field of Classification Search
CPC ............... G06F 17/2755; G06F 17/277; G06F 17/2785; G06F 17/289; G06F 17/5022; G06F 17/5027; G06F 17/5045; G06F 17/505; G06F 17/5054; G06F 17/5077; G06F 17/5081; G06F 19/00; G06F 19/321; G06F 19/324; G06F 19/3418; G06F 19/3481; G06F 3/0482; G06F 3/04842; G06F 8/31; G06F 8/38; G06F 8/443; G06F 8/60; G06F 9/44526; G06F 9/451; G06F 9/455; G06F 9/46
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,145,623 B1 | 3/2012 | Mehta et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0005036 A1* | 1/2006 | Hu .................... G06Q 40/02 713/182 |
| 2006/0021019 A1 | 1/2006 | Hinton et al. |
| 2006/0206834 A1 | 9/2006 | Fisher et al. |
| 2008/0010243 A1* | 1/2008 | Weissman .......... G06F 16/2455 |
| 2008/0033920 A1* | 2/2008 | Colclasure ............ H04L 63/10 |
| 2008/0114749 A1 | 5/2008 | Chandhok et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0157599 A1* | 6/2009 | Klinkner ............... G06Q 30/02 |
| 2009/0177744 A1 | 7/2009 | Marlow et al. |
| 2009/0222284 A1* | 9/2009 | McEachern .......... G06Q 30/02 705/2 |
| 2010/0058206 A1 | 3/2010 | Ollrogge et al. |
| 2010/0131853 A1* | 5/2010 | Palmieri ................ G06F 9/451 715/733 |
| 2011/0158222 A1 | 6/2011 | Kerr et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jackobson et al. |
| 2015/0007050 A1 | 1/2015 | Jackobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

EXECUTION OF BULK REQUESTS AGAINST ONE OR MORE DATABASES

CLAIM OF PRIORITY

The present application is a continuation of U.S. application Ser. No. 13/874,379, filed Apr. 30, 2013 (now U.S. Pat. No. 9,619,530), which is a continuation of U.S. application Ser. No. 13/006,366, filed Jan. 13, 2011 now U.S. Pat. No. 9,471,648), which claims priority to U.S. Provisional Appl. No. 61/309,314, filed Mar. 1, 2010; the disclosures of each of the above-referenced applications are incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data display, and more particularly to managing security of displayed data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems (e.g., multi-tenant on-demand database systems, etc.) commonly allow for a display of data from the systems to one or more users associated with the systems. For example, a user of the system may be able to view a plurality of data sets of the system utilizing an interface provided by the system. Unfortunately, techniques for creating, utilizing, and updating such display of data have been associated with various limitations.

Just by way of example, traditional methods of creating an interface in which system data is displayed may associate a plurality of interfaces with a single user and may fail to take into account different privileges and preferences of different users of the system. In another example, traditional methods of updating an interface may include updating interfaces for all users according to a schedule, which may result in an inefficient use of system resources. Accordingly, it is desirable to provide techniques that improve the creation, utilization, and updating of system data display interfaces.

BRIEF SUMMARY

In accordance with embodiments, there are provided mechanisms and methods for displaying one or more data sets to a user. These mechanisms and methods for displaying one or more data sets to a user can enable enhanced data security, more relevant data display, reduced processing, etc.

In an embodiment and by way of example, a method for displaying one or more data sets to a user is provided. In one embodiment, an identifier of a user of a system is received. Additionally, one or more data sets are retrieved from the system, based on the identifier. Further, the one or more data sets are displayed to the user, utilizing a graphical interface.

While one or more implementations and techniques are described with reference to an embodiment in which displaying one or more data sets to a user is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for displaying one or more data sets to a user.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for displaying one or more data sets to a user will be described with reference to example embodiments.

Figure 1:
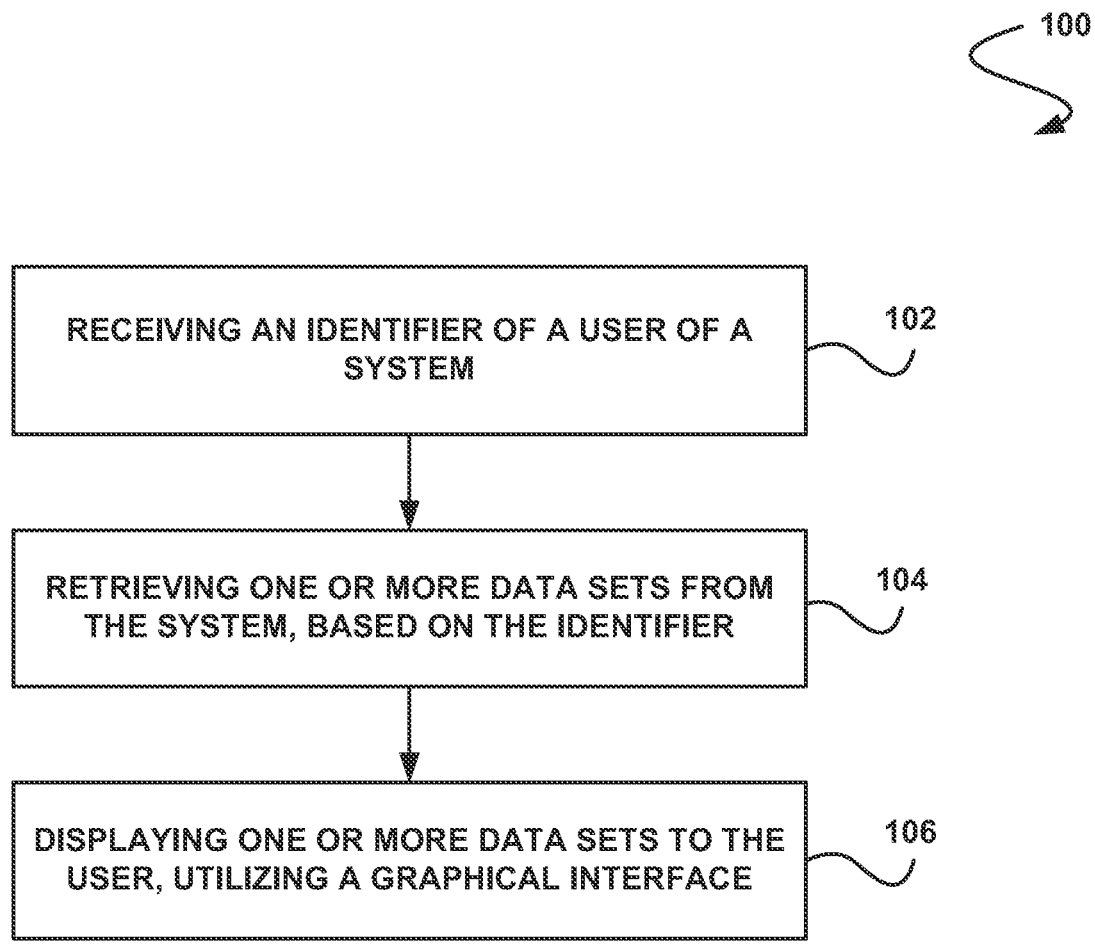
FIG. 1 illustrates a method for displaying one or more data sets to a user, in accordance with one embodiment.

FIG. 1 illustrates a method 100 for displaying one or more data sets to a user, in accordance with one embodiment. As shown in operation 102, an identifier of a user of a system is received. In one embodiment, the system may include a client, a server, a cloud-based system, a multi-tenant on-demand database system, etc. Additionally, in another embodiment, the user of the system may include a client of the system, a member of an organization, corporation, or other grouping of one or more individuals within the system, an entity utilizing services of the system (e.g., as a customer of the system, a customer of the client, etc.), etc.

Further, in one embodiment, the identifier may include any data that identifies the user of the system. For example, the identifier may include a tag associated with the user, a name of the user (e.g., a full name, a user name, etc.), a number or alphanumeric string associated with the user, metadata associated with the user, etc. In another embodiment, the identifier may be received in response to the user logging into the system. For example, the identifier may be received in response to the user entering a login name and password into an interface of the system (e.g., a web interface, a mobile browser interface, etc.). In yet another embodiment, the identifier may be received in response to a request from the user. For example, the identifier may be received in response to a request for data (e.g., a data update request, a refresh request, etc.).

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, one or more data sets are retrieved from the system, based on the identifier. In one embodiment, the data sets may be stored in and retrieved from a data store of the system (e.g., a system database, etc.). In another embodiment, the data sets that are retrieved may be associated with the identifier of the user. For example, the data sets may include metadata that includes the identifier of the user. In another embodiment, one or more privileges associated with the user may enable the user to view the data sets that are retrieved. For example, only the data sets that the user is privileged to see may be retrieved from the system. In this way, the retrieved data sets may be relevant to the user.

Further, in yet another embodiment, the one or more data sets may include one or more reports. For example, the one or more data sets may include a plurality of reports summarizing system data associated with the user. For example, the one or more reports may include monthly sales reports for the user's department, annual income reports for the user, upcoming events in the user's workplace that the user may attend, etc. In another embodiment, the one or more data sets may include one or more visual diagrams. For example, the one or more data sets may include a bar graph, a pie graph, a line graph, etc.

Further still, as shown in operation 106, the one or more data sets are displayed to the user, utilizing a graphical interface. In one embodiment, the one or more data sets may be displayed to the user simultaneously, utilizing the graphical interface. In another embodiment, the graphical interface may include a dashboard. In yet another embodiment, the graphical interface may be stored within the system. In this way, only data associated with the user may be dynamically displayed to the user via the graphical interface.

Also, in one embodiment, the graphical interface may be created by an entity associated with the user. For example, an organization of which the user is a member may include a developer that creates the graphical interface. In another example, a single graphical interface may be created for all users associated with the organization, but each individual user's graphical interface may display only the data sets associated with that user. For instance, the single specified graphical interface may be populated with only data sets from the system that the user is authorized to see. In this way, creation of a graphical interface for displaying data sets to a plurality of users may be simplified, while maintaining data security within the system, since a single specified graphical interface may be utilized by a plurality of users.

In addition, in another embodiment, the entity that created the graphical interface may view the interface of the user during the development of the interface. For example, the developer of the interface may edit or preview the graphical interface from the perspective of the user. In another example, the developer of the interface may view the graphical interface from the perspective of a plurality of users.

Also, in one embodiment, the user may view one or more additional data sets associated with a second user of the system, utilizing the graphical interface. For example, the user may view these additional data sets based on a viewing privilege of the user. More specifically, in one embodiment, if the viewing privilege of the user allows the user to access data associated with the second user, an identifier of the second user of the system may be used to retrieve the additional data sets, which may then be displayed to the user utilizing the graphical interface.

Further, in another embodiment, additional data may be retrieved from the system and displayed to the user utilizing the graphical interface in response to a request from the user. For example, the user may request a refresh of the graphical interface, and in response to the request, one or more updated data sets may be retrieved from the system. In yet another embodiment, additional data may be retrieved and displayed only in response to a request from the user. In this way, such retrieval and display may be on-demand, thereby saving resources of the system by avoiding mandatory refreshes of the graphical interface.

Figure 2:
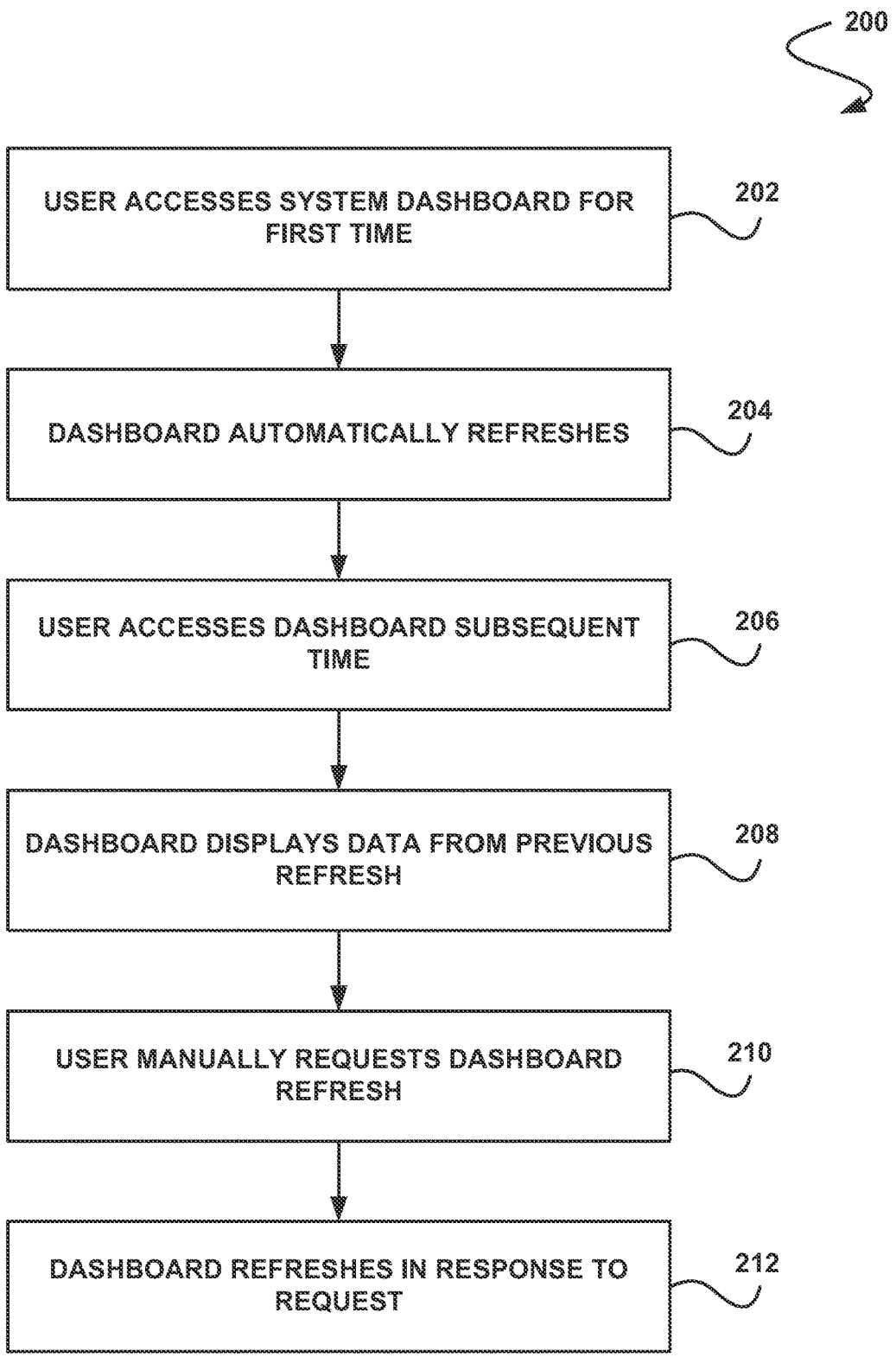
FIG. 2 illustrates a method for performing an on-demand dashboard refresh, in accordance with another embodiment.

FIG. 2 illustrates a method 200 for performing an on-demand dashboard refresh, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a user accesses a system dashboard for the first time. In one embodiment, the user may select the dashboard for the first time when the user is logged into the system. In another embodiment, the dashboard may be automatically presented to the user when the user logs into the system for the first time. In yet another embodiment, the dashboard may be scheduled and sent to the user (e.g., via email, etc.). Of course, however, the system dashboard may be accessed in any manner.

Additionally, as shown in operation 204, the dashboard automatically refreshes with updated data upon being accessed for the first time. For example, a request for updated data sets may be automatically sent to the system, and data retrieved from the system in response to the automatic request may provide the dashboard with the most recent data sets associated with the user. Further, as shown in operation 206, the user accesses the dashboard at a time subsequent to the first time. Further still, as shown in operation 208, the dashboard displays the data from the previous refresh in response to the subsequent access. For example, the results of the automatic refresh may be saved in the system and may be retrieved from the system and displayed in response to the subsequent access.

Also, as shown in operation 210, the user manually requests a refresh of the dashboard. For example, the user may select an icon on the dashboard that triggers a refresh request for the dashboard. In addition, as shown in operation 212, the dashboard refreshes in response to the request. For example, data retrieved from the system in response to the manual request may provide the dashboard with the most recent data sets associated with the user. In this way, system resources may be conserved by updating the dashboard using a lazy/on-demand refresh technique.

Table 1 illustrates an example of a dashboard viewer workflow. Of course, it should be noted that the workflow shown in Table 1 is set forth for illustrative purposes only, and thus should not be construed as limiting in any manner.

TABLE 1

```
* open a normal dashboard
    ○ view data as the pre-determined running user
    ○ get feedback as to when the dash was last refreshed and who the running user is
* open a RARU-type dashboard and get visual feedback that user is about to open a
dash of a different kind
    ○ if this is the 1st time this user is viewing this dashboard, then trigger an automatic
refresh
        + see feedback about refresh progress (may display components as they're
refreshed)
        + view the data as him/herself
        + view blank components (and error msg) for those tied to reports in folders
he/she does not have access to
        + refresh the dashboard
            # do not refresh (and provide feedback) if the last refresh for this user was
within the maximum refresh limit (e.g., MAXREFRESH, etc,)
            # view the data as him/herself when refresh is done
    ○ if this is not the 1st time the dash is being viewed by this user, bring up last
refreshed dashboard (and require manual refresh to update)
        + if new components have been added since last refresh, trigger automatic
refresh
        + refresh the dashboard
            # do not refresh (and provide feedback) if the last refresh for this user was
within the maximum refresh limit (MAXREFRESH)
            # if refreshing, see feedback about progress
            # view the data as him/herself when refresh is done
            # view blank components (and error msg) for those tied to reports in folders
he/she does not have access to
    ○ navigate the hierarchy below him/her in the role hierarchy to select a running
user dynamically (RASU)
    ○ if "peer view" is allowed, select from peers (others reporting to his/her manager)
as running user (RASU)
        + "peer view" may apply to viewers below the role hierarchy of the dashboard
builder (RASU)
    ○ drill from dashboard to underlying report
        + if the user has access to the report folder, see the report (FLS applies, data
should match that in dashboard)
        + if the user doesn't have access to the report folder, see "insufficient privs"
error message
    ○ view blank components where FLS or filter criteria results in no visible data
* click on a link of a RARU dashboard
    ○ if the user doesn't have access to the dash folder, see "insufficient privs" error
```

In another embodiment, an efficient execution of dynamic dashboards in a hosted, multi-tenant environment may be provided. Additionally, a lazy evaluation strategy may be implemented (e.g., a dashboard may only be computed when a user views it for the first time, or actively pushes the refresh button). In another embodiment, reports underlying the dashboard may be submitted to a plurality of different queues (e.g., small/med/large, etc.) depending on their previous runtime (e.g., if no previous runtime then they go to the small queue, etc.). This may help prevent long running requests from starving shorter reports for users in the same organization. There may be a per-organization limit on the number of reports that can be run at any one time. This may prevent one organization from starving other organizations.

Table 2 illustrates an example of dashboard interface details. Of course, it should be noted that the details shown in Table 2 are set forth for illustrative purposes only, and thus should not be construed as limiting in any manner.

TABLE 2

Dashboard View
- 1st time viewer of dashboard x by user y
  - May see an empty dashboard with an "As of" timestamp of "never"
  - the act of viewing may trigger a dashboard refresh. The refresh may be done asynchronously via the dashboard queue, (ie., not done synchronously, etc.)
  - This may be a common case due to the lazy evaluation strategy
  - "As of" timestamp may be personalized for each viewing user, i.e., is an attribute of the dashboard+viewing-user rather than just the dashboard
- As Of timestamp (may be renamed to Last refreshed at)
  - maintained for each pair(dashboard_id and viewing userid)
- A visual indicator may indicate to users that they are viewing a RARU dashboard ("Displaying data as <username>" string below last refresh date
- The UI for Manual Refresh (Refresh and Refresh Now) may be unchanged but the semantics differ for RARU dashboards. Refresh for a RARU dashboard only affects the user who is viewing the dashboard. That is, the dashboard components may only be refreshed (e.g., asynch, etc.) for that user, and correspondingly the "As of" timestamp may be only updated for that single user.

Dashboard Create/Edit
- ability to specify a Running User dashboard versus the current "Configured User" dashboard (i.e., a "dashboard type" selector, etc.)
- ability to switch a dashboard from Configured User to RARU
- ability to switch a dashboard from RARU to Configured User
  - may clean up all the chart data for all the running users of the RARU dashboard. This may be done in the background.
- when a component is added to a RARU dashboard, may check the set of users who have access to the dashboard folder to see if they have access to the report folder. If at least one user does not have access to the report folder, then may inform the administrator as such.

Figure 3:
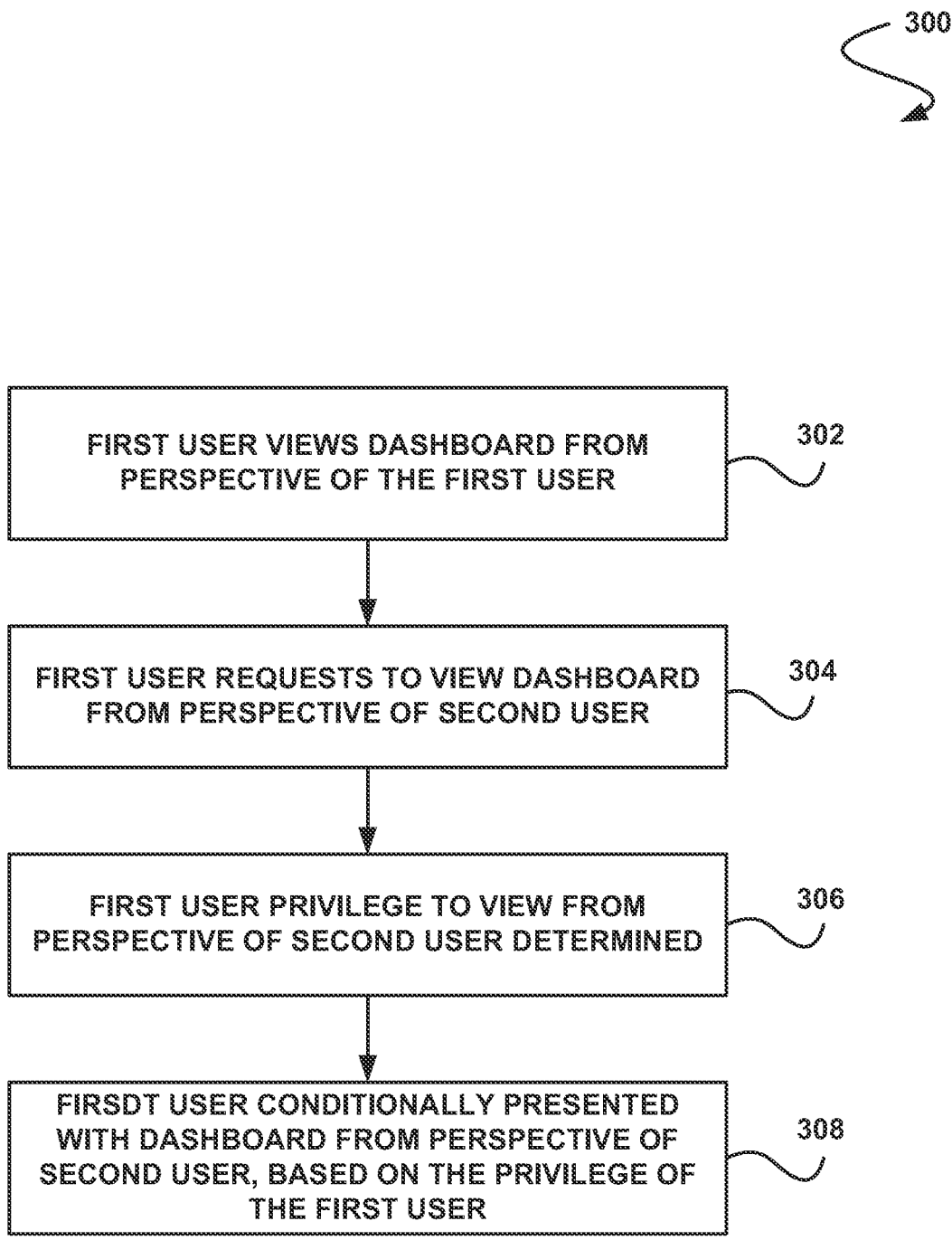
FIG. 3 illustrates a method for performing selectable user dashboard viewing, in accordance with another embodiment.

FIG. 3 illustrates a method 300 for performing selectable user dashboard viewing, in accordance with another embodiment. As an option, the present method 300 may be carried out in the context of the functionality of FIGS. 1-2. Of course, however, the method 300 may be carried out in any desired environment. The aforementioned definitions may apply during the present description.

As shown in operation 302, a first user of a system views a dashboard from the perspective of the first user. For example, the data retrieved from the system that is displayed on the dashboard may include only data that the first user is authorized to view. Additionally, as shown in operation 304, the first user requests to view the dashboard from the perspective of a second user of the system. In one embodiment, both the first user and the second user may be members of an organization of the system.

Further, as shown in operation 306, it is determined whether the first user has an appropriate privilege to view the dashboard from the perspective of the second user. In one embodiment, a hierarchy may exist within the organization that includes the first user and the second user. In another embodiment, it may be determined whether the first user has a position in the hierarchy that is superior to the second user. For example, the first user may include a sales manager, and the second user may include a salesperson that is managed by the sales manager and is therefore lower in the user hierarchy than the first user. In yet another embodiment, if it is determined that the first user has a position in the hierarchy that is superior to the second user, the first user may be determined to have an appropriate privilege to view the dashboard from the perspective of the second user.

Further still, in one embodiment, it may be determined whether a permission has been granted to the first user to view the dashboard from the perspective of the second user. For example, the first user may be at the same level as the second user or at a lower level than the user on the hierarchy, but may have specific permission to view the dashboard from the perspective of the second user. In another example, this permission may be granted by a superuser, a manager, an administrator, etc. In another embodiment, if it is determined that the first user has permission to view the dashboard from the perspective of the second user, the first user may be determined to have an appropriate privilege to view the dashboard from the perspective of the second user.

Also, as shown in operation 308, the first user may be conditionally presented with the dashboard from the perspective of the second user, based on the privilege of the first user. In one embodiment, if it is determined that the first user has an appropriate privilege to view the dashboard from the perspective of the second user, then the first user may be presented with the dashboard from the perspective of the second user. For example, the dashboard presented to the user may be populated with only data that the second user is authorized to view. In another embodiment, if it is determined that the first user does not have an appropriate privilege to view the dashboard from the perspective of the second user, then the first user may not be presented with the dashboard from the perspective of the second user, an error message or alert may be produced, etc. In this way, a user viewing a dashboard may be able to change the data populated within the dashboard, based on one or more viewing privileges of the user.

Table 3 illustrates an example of a workflow for running a dashboard builder for user and selectable user dashboards. Of course, it should be noted that the workflow shown in Table 3 is set forth for illustrative purposes only, and thus should not be construed as limiting in any manner.

TABLE 3

- create a new dashboard
  - specify dashboard as RARU type (RARU org perm may be enabled)
  - specify dashboard running user (for preview/editing purposes only)
  - specify whether peer view is allowed or not (RASU)
  - may get an error on saving properties if the org has maxed out the limit of # of RARU dashes (e.g., MAXRARU, etc.)

TABLE 3-continued

- ○ add components to the dashboard
  - ■ view components refreshed synchronously
- ○ remove components from the dashboard
- ○ clone the dashboard
  - ■ + get an error if the org has maxed out on MAXRARU
- ○ delete the dashboard
- ○ save
- ● edit an existing "chosen user" (normal, existing kind) dashboard
  - ○ add components
  - ○ remove components
  - ○ edit components
  - ○ change to RARU type
    - ■ may get an error if the org has maxed out on MAXRARU
    - ■ if original dash was scheduled/emailed, may trigger alert that scheduling will be dropped
      - ● drop scheduling
    - ■ add components
    - ■ remove components
    - ■ edit components
    - ■ clone the dashboard
    - ■ delete the dashboard
    - ■ save dash
    - ■ refresh the dashboard
      - ● may not refresh (and provide feedback) if the last refresh for this user was within the maximum refresh limit (MAXREFRESH)
      - ● if refreshing, see feedback about progress
    - ■ edit properties and select a different running user (for preview/editing purposes only) and save
      - ● # if this is the 1st time this selected user is viewing this dashboard, may trigger an automatic refresh
        - ○ see feedback about refresh progress (may display components as they're refreshed)
        - ○ view the data as selected user
        - ○ view blank components (and error message) for those tied to reports in folders the selected user does not have access to
      - ● # if this is not the 1st time the dash is being viewed for this selected user, may bring up last refreshed dashboard (and may require manual refresh to update)
        - ○ if new components have been added since last refresh, may trigger automatic refresh
        - ○ refresh the dashboard
          - ■ may not refresh (and provide feedback) if the last refresh for this user was within the maximum refresh limit (e.g., MAXREFRESH, etc.)
          - ■ if refreshing, see feedback about progress
          - ■ view the data as selected user when refresh is done
          - ■ view blank components (and error message) for those tied to reports in folders he/she does not have access to
    - ● + change it back to normal type
      - ○ # specify a running user (may keep dashboard data for other users; this dashboard may now no longer count towards a RARU dashboard limit per org)
        - ■ save
        - ■ schedule dashboard/emailed dash
      - ○ # change it again to RARU type (old dashboard data may be available; this dashboard may now not count again towards the RARU dash limit per org)
        - ■ get an error if the org has maxed out on MAXRARU
        - ■ save
  - ○ clone it
    - + change from normal to RARU type
      - # may get an error if the org has maxed out on MAXRARU
      - # save
- \* open a report used in a RARU dashboard
  - ○ edit the report and save
    - + open the dashboard and trigger automatic refresh for him/herself only (i.e., the refresh happens only when dash is opened and only for the particular user viewing it)
  - ● view dashboard
    - ○ see data as if he/she (dash editor) were the running user
    - ○ allow scheduling of RARU dashes but with different frequency and window of execution than regular dashboards
  - ● report on dashboards which are of RARU type (may be necessary to push a package containing CRT)
    - ○ view how many people are currently set as viewers of this dash TABLE 3-continued

- add a role or user to dashboard folder containing a RARU dash
  - ○ remove a role or user from a dashboard folder containing a RARU dash (dash data may be kept for other users; this dash may now no longer count towards the RARU dash limit per org)
    - ■ + re-add a role or user to dashboard folder containing a RARU dash (old dash data may be available)

Figure 4:
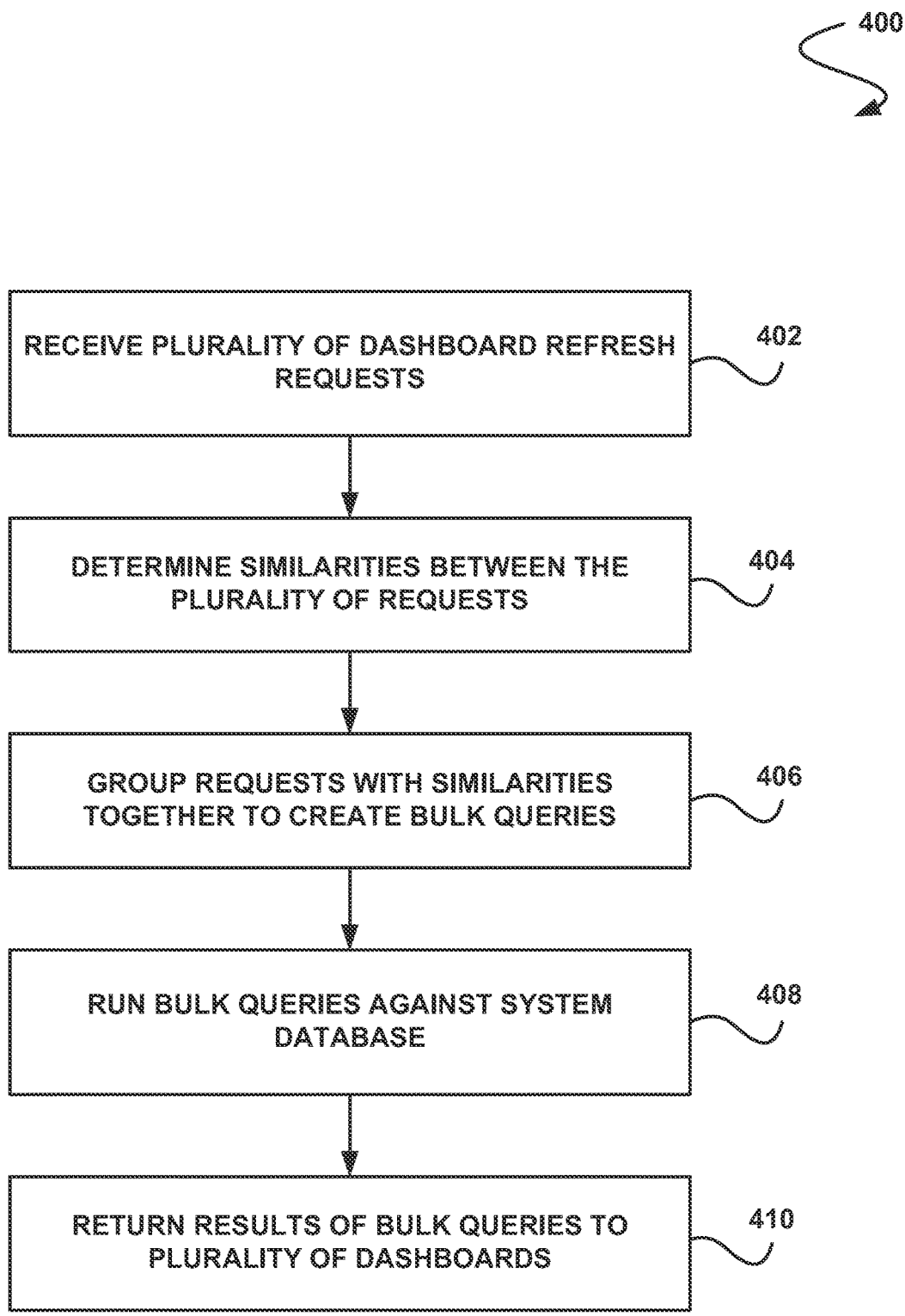
FIG. 4 illustrates a method for performing bulk query execution, in accordance with another embodiment.

FIG. 4 illustrates a method 400 for performing bulk query execution, in accordance with another embodiment. As an option, the present method 400 may be carried out in the context of the functionality of FIGS. 1-3. Of course, however, the method 400 may be carried out in any desired environment. The aforementioned definitions may apply during the present description.

As shown in operation 402, a plurality of dashboard refresh requests is received. In one embodiment, a plurality of dashboards may be viewed concurrently by a plurality of users, and each of the plurality of users may submit a request to refresh the dashboard they are currently viewing. In another embodiment, a plurality of dashboards may be viewed by a plurality of users within a predetermined time period, and each of the plurality of users may submit a request to refresh the dashboard they are currently viewing within that predetermined time period.

Additionally, as shown in operation 404, similarities between the plurality of refresh requests are determined. In one embodiment, similarities between the source of the requests to refresh the dashboard may be determined. For example, sources of dashboard refresh requests originating from the same time zone, the same location, the same organization, etc. may be identified. In another embodiment, the similarities between the plurality of refresh requests may be determined utilizing one or more algorithms.

Further, as shown in operation 406, requests having determined similarities are grouped together to create bulk queries. In one embodiment, each request from a group of requests having a determined similarity (e.g., requests from the same geographical location, etc.) may be unioned together to form a bulk query (e.g., a bulk request for data from the system database, etc.). Further still, as shown in operation 408, the bulk queries are run against the system database. In one embodiment, each bulk query may be run against a database in the system in order to request the data described in the query from the system.

Also, as shown in operation 410, the results of the bulk queries are returned to the plurality of dashboards. In one embodiment, the data returned from the system database in response to a bulk query may be divided into slices of data responsive to each dashboard refresh request of the group. In this way, dashboard users may be grouped by locale and may have their refresh requests grouped in order to reduce an amount of request traffic sent to the system database.

In one embodiment, one bulk report may be run for a RARU dashboard (e.g., taking into account all potential users of the dashboard) and then each user's particular view of the dashboard may be computed from the bulk report. For example, for a dashboard with five hundred users and one component (e.g., a report, etc.), one query may be sent to the database versus five hundred. For example, post-processing may be used to get the correct data for each of the five hundred users. In yet another embodiment, running the bulk repot may include forming the one bulk query from the set of users, and post-processing (e.g., slicing, etc.) the bulk result set to get the data that is unique to each user. In still another embodiment, an "eager" evaluation may be performed in addition to the use of one or more algorithms to slice the bulk result set for each user.

In this way, a rich set of query behavior that is localized for users may be supported, a rich sharing model may be used, and a dynamic dashboard that can be viewed by many users may be supported. Furthermore, the query request may be broadened to take into account the users, the bulk result set may be sliced to get back to each individual's view of the dashboard data.

In another embodiment, a "running user" configuration may apply to the whole dashboard (not per component) and the dashboard may be calculated for all users with read access to it. Additionally, there may still be a designated running user that may be used to get preview data when editing the dashboard. Further, running user dashboards may maintain a stricter state than the current mechanism, such that all components of the same dashboard may display data corresponding to the same refresh date, and all users may see the same dashboard with the same refresh date.

Table 4 illustrates an example of asynchronous dashboard processing using a message queue framework. Of course, it should be noted that the processing shown in Table 4 is set forth for illustrative purposes only, and thus should not be construed as limiting in any manner.

TABLE 4

- fetch list of dashboard running users, store to temp file
  - ○ We may do this via looking at the users who have security access to the folder that stores the dashboard, but other means may work, e.g., a list of users.
- for each component of the dashboard
  - ○ validate report may be supported in bulk mode (based on report type, sharing, scope, etc.)
  - ○ run bulk report, store result-set to temp file
    - ■ use system mode to bypass sharing, FLS and CRUD
    - ■ modify report definition for bulk execution
      - ● replace report scope with smallest possible superset scope (may take into account list of running users)
      - ● Replace filters on dates and timestamps with smallest possible superset to reflect the potentially different time zones of the running users
      - ● Rewrite filters on columns that have collation difference for users with different locales TABLE 4-continued

- ● add columns required by post processing if they are not already in report (e.g., owner_id, custom_entity_id, etc.)
- ■ result-set is streamed directly to temp file, no need to run through sorter
- ■ collect on the fly deduped list of ids that will be used to reduce security/scope snapshots data
- ○ fetch required security/scope snapshots to temp files
  - ■ root entity
    - ● fetch per running_user_id subset of accessible bulk report's root entity id
      - ○ unnecessary when scope implies read access
      - ○ unnecessary when user has view all data access
    - ● fetch per running_user_id subset of bulk report's root entity id in scope
  - ■ other entities to which sharing should be applied
    - ● e.g. for report opportunity with custom entity
    - ● fetch per running_user_id subset of bulk report's accessible custom entity ids
- ○ post process bulk result-set to create each individual running user's result-set
  - ■ use previously fetched snapshots to filter out rows from bulk result-set
- ○ process each running user's result-set using the regular report execution path
  - ■ except that data is coming from temp file instead of Oracle result-set
  - ■ use running user's context, which will apply proper FLS and CRUD to report definition
  - ■ still store results in chart_data table using dashboard run id as report_session_id instead of report_id
- ○ once all running users are processed, mark component as complete In one embodiment, all temporary files may be created on a file server. Additionally, in another embodiment, the algorithm may describe an all-or-nothing approach, but an optimization may be done to look for sets of compatible users. For example, there may be 100 users for a dashboard, where 60 of these users may have the same locale, and hence have identical collation/sorting characteristics. Another 30 may have a different locale, and the remaining 10 may all have different locales. In this case, the algorithm may be run as described above two times—once for the group of 60 users and once for the group of 30 users. Since no efficiencies may be obtained from bulk execution for the remaining 10, the bulk execution may not be used for them.

System Overview

Figure 5:
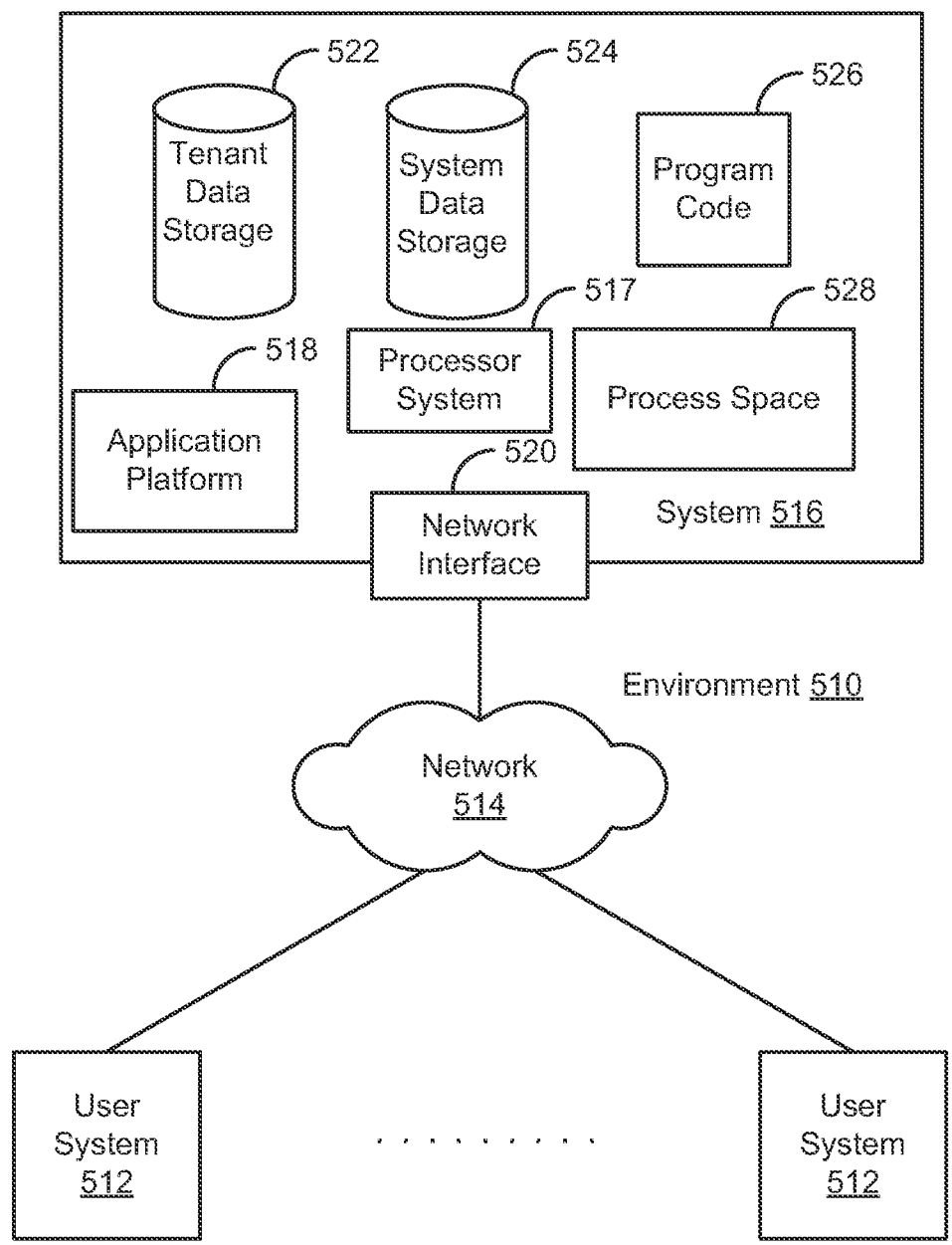
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
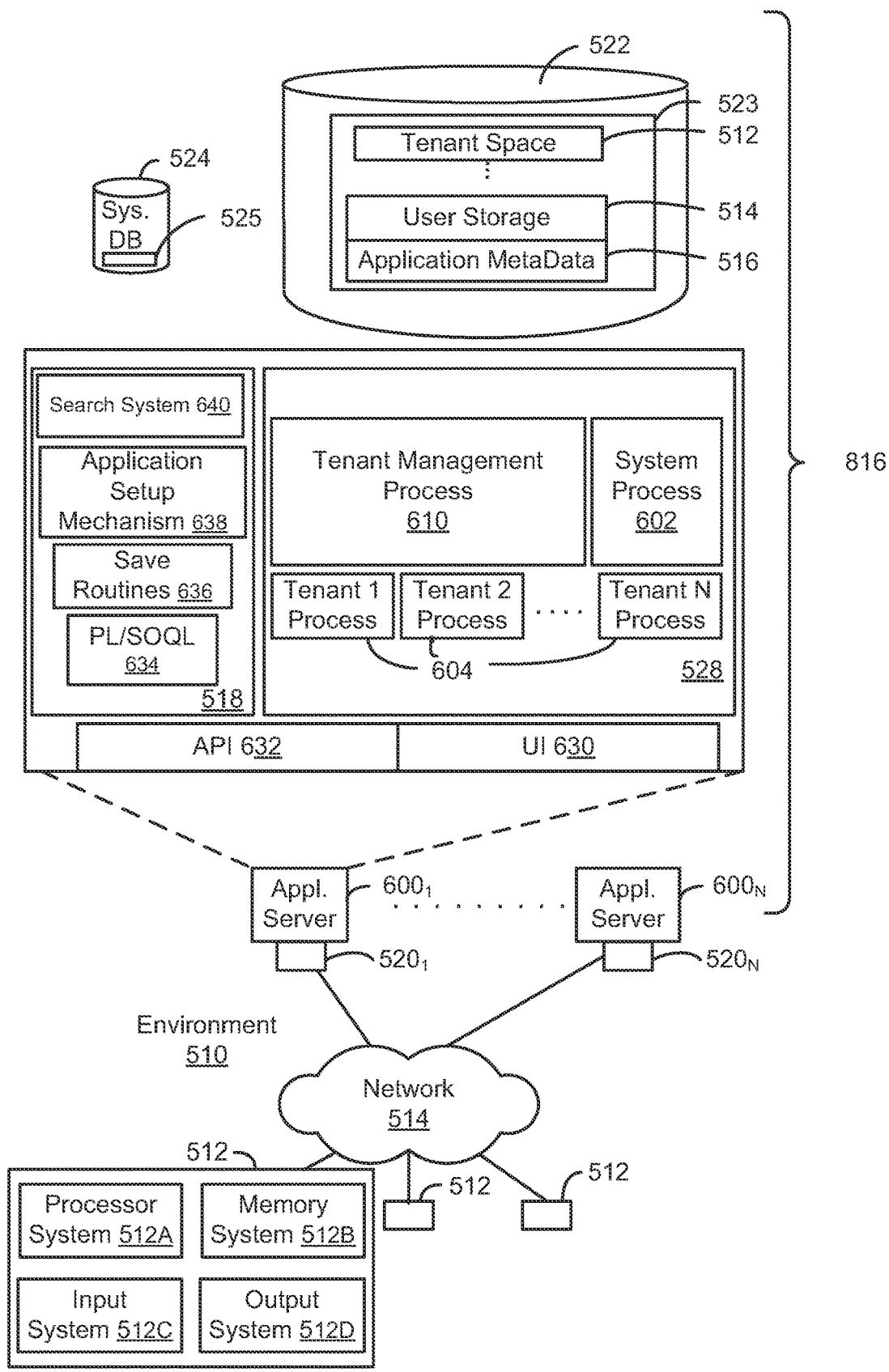
FIG. 6 illustrates a block diagram of an embodiment of elements of FIG. 4 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$ system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PULSOQL 634 that provides a programming language style interface extension to API 632. A detailed description of some PUSOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable storage medium having stored thereon a plurality of instructions that are capable of being executed by a computer system to cause operations comprising:
  receiving, from a plurality of users of a multi-tenant database system, a plurality of requests to update data sets associated with a graphical interface;
  determining one or more similarities between a subset of the plurality of requests sent by a corresponding subset of the plurality of users, wherein the one or more similarities between the subset of the plurality of requests include at least one of:
    the subset of the plurality of requests originated from a same time zone;
    the subset of the plurality of requests originated from a same geographic location; or
    the corresponding subset of the plurality of users are associated with a same tenant of the multi-tenant database system;
  based on the one or more similarities, executing a bulk request for the corresponding subset of the plurality of users against one or more databases of the multi-tenant database system; and
  determining, based on a bulk data set, an updated data set for each of the corresponding subset of users.

2. The non-transitory computer-readable storage medium of claim 1, wherein the operations further comprise:
  generating the bulk request based on the one or more similarities.

3. The non-transitory computer-readable storage medium of claim 2, wherein the generating the bulk request includes creating a database query specifying a union operation for the subset of the plurality of requests.

4. The non-transitory computer-readable storage medium of claim 1, wherein the operations further comprise:
  prior to executing the bulk request, verifying whether each user of the corresponding subset of users is permitted to access a corresponding updated data set based on one or more privilege levels associated with each user.

5. The non-transitory computer-readable storage medium of claim 1, wherein the subset of the plurality of requests include one or more requests of the plurality of request received within a predetermined time period.

6. A method, comprising:
receiving, from a plurality of users of a multi-tenant database system, a plurality of requests to update data sets associated with a user interface;
determining one or more similarities between a subset of the plurality of requests sent by a corresponding subset of the plurality of users, wherein the one or more similarities between the subset of the plurality of requests includes at least one of:
the subset of the plurality of requests originated from a same time zone;
the subset of the plurality of requests originated from a same geographic location; or
the corresponding subset of the plurality of users are associated with a same tenant of the multi-tenant database system;
based on the one or more similarities, executing a bulk request for the corresponding subset of the plurality of users against one or more databases of the multi-tenant database system; and
determining, based on a bulk data set, an updated data set for each of the corresponding subset of users.

7. The method of claim 6, further comprising:
prior to executing the bulk request, comparing the bulk data set to access permissions for each user of the corresponding subset of users.

8. The method of claim 6, further comprising:
sending, to each user of the corresponding subset of users, the updated data set associated with the user interface, wherein the user interface for each user of the corresponding subset of users is operable to display the updated data set.

9. The method of claim 8, wherein the sending the updated data set includes populating the user interface for each user of the corresponding subset of users with the updated data set that each user is authorized to access.

10. The method of claim 6, wherein the user interface for a given user is operable to graphically display a report associated with an updated data set corresponding to the given user.

11. The method of claim 6, wherein the receiving the plurality of requests includes receiving, from a first user of the plurality of users, a request to access an updated data set corresponding to a second user of the plurality of users.

12. The method of claim 11, further comprising:
determining, based on one or more access privileges of the first user, whether the first user is authorized to access the updated data set corresponding to the second user.

13. The method of claim 12, wherein the first user and the second user are associated with a first tenant of the multi-tenant database system, and wherein the one or more access privileges of the first user are based on a hierarchy associated with the first tenant.

14. An apparatus, comprising:
at least one processor; and
a memory having instructions stored thereon that, when executed by the at least one processor, cause the apparatus to perform operations, comprising:
receiving, from a plurality of users of a multi-tenant database system, a plurality of requests to update data sets associated with a graphical interface;
determining one or more similarities between a subset of the plurality of requests sent by a corresponding subset of the plurality of users, wherein the one or more similarities between the subset of the plurality of requests include at least one of:
the subset of the plurality of requests originated from a same time zone;
the subset of the plurality of requests originated from a same geographic location; or
the corresponding subset of the plurality of users are associated with a same tenant of the multi-tenant database system;
based on the one or more similarities, executing a bulk request for the corresponding subset of the plurality of users against one or more databases of the multi-tenant database system; and
determining, based on a bulk data set, an updated data set for each of the corresponding subset of users.

15. The apparatus of claim 14, wherein the operations further comprise:
creating the bulk request, based on the one or more similarities, from the subset of the plurality of requests.

16. The apparatus of claim 14, wherein the determining the updated data set includes comparing the bulk data set to access permissions for each user of the corresponding subset of users.

17. The apparatus of claim 14, wherein the graphical interface includes a dashboard component operable to graphically display data sets corresponding users of the multi-tenant database system.

18. The apparatus of claim 14, wherein the operations further comprise:
sending, to each user of the corresponding subset of users, the updated data set associated with the graphical interface, wherein the graphical interface for each user of the corresponding subset is operable to display the updated data set.

* * * * *